United States Patent Office 3,419,610
Patented Dec. 31, 1968

3,419,610
PROCESS FOR POLYMERIZING FLUORINATED OLEFIN EPOXIDES
Stanley Temple, Newark, Del., assignor to E. I. du Pont de Nemours and Company, Wilmington, Del., a corporation of Delaware
No Drawing. Filed Oct. 23, 1965, Ser. No. 504,168
22 Claims. (Cl. 260—544)

ABSTRACT OF THE DISCLOSURE

Preparation of polyfluorinated ethers by reaction of a polyfluoroolefin epoxide with a tertiary salt of the structure $R_fOM$:

BACKGROUND OF THE INVENTION

The present invention is directed to a novel process for polymerization of fluorinated olefin epoxides.

It is known that fluorinated olefin epoxides such as hexafluoropropylene oxide and tetrafluoroethylene oxide can be polymerized in the presence of activated charcoal at temperatures of −80° C. to +40° C. Other processes for polymerizing these epoxides involve contacting the epoxides in a polar aprotic solvent with a source of fluoride ions. The usual sources of fluoride ions in these processes are cesium fluoride. However, one of the difficulties of this latter technique of initiating the polymerization of fluorinated olefin epoxides is that often the source of fluoride ions is of low solubility in aprotic solvents. Other procedures for polymerizing fluorinated olefin epoxides involve the use of quaternary ammonium salts, such as the bromide or iodide, or tertiary amines or phosphines. However, the disadvantage of these latter procedures is that they introduce unstable organic end groups into the polymers.

DESCRIPTION OF THE INVENTION

It is, therefore, an object of this invention to provide a novel process for the polymerization of fluorinated olefin epoxides which uses new polymerization initiators highly solube in aprotic solvents.

It is another object of this invention to provide a novel process for polymerizing fluorinated olefin epoxides which is capable of providing stable organic end groups to the resulting polymeric products.

These and other objects will become apparent from the following description and claims.

More specifically, the present invention is directed to a process for preparing polyethers which comprises (A) contacting a polyfluoroolefin epoxide with a salt of the structure $R_fOM$ in a polar aprotic organic reaction medium, wherein M is an alkali metal cation and $R_f$ is a $C_4$ to $C_{10}$ perfluoro hydrocarbon free of aliphatic unsaturation, the salt being further characterized by having the oxygen atom attached to the $R_f$ group through a carbon atom which is in turn attached only to other carbon atoms, and
(B) recovering from the mixture the resulting polymer of the polyfluoroolefin epoxide.

The present process is used for polymerizing polyfluoroepoxides, hereinafter referred to as epoxides. The polymerization is carried out in the presence of an initiator and a polar aprotic organic reaction medium. The initiator is an alkali metal salt represented by the formula $R_fOM$, wherein $R_f$ is a perfluoro hydrocarbon group of 4 to 10 carbons free of aliphatic unsaturation and M is an alkali metal cation such as lithium, sodium, potassium, rubidium and cesium. These alkali metal salts are derived from $R_fOH$, a monohydroxy-substituted perfluoro hydrocarbon compound wherein the hydroxyl group is attached to a carbon which is in turn attached only to other carbons. The monohydroxy perfluoro hydrocarbon compounds are represented by the perfluoro-tertiary alcohols of the structure

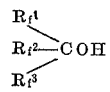

wherein each of $R_f^1$, $R_f^2$, and $R_f^3$ are perfluoro hydrocarbon groups free of aliphatic unsaturation and generally are perfluoroalkyl groups. One of $R_f^1$, $R_f^2$, or $R_f^3$ may be a perfluorophenyl or alkyl-substituted phenyl. The monohydroxy perfluoro hydrocarbon compound may also be the perfluorophenols or alkyl-substituted perfluorophenols of empirical formula $C_nF_{2n-7}OH$.

Representative examples of the monohydroxy perfluoro hydrocarbon compounds, $R_fOH$, from which the alkali metal salt initiators of this invention are derived, are as follows: $(CF_3)_3COH$, $(CF_3)_2C(C_2F_5)OH$, $(C_2F_5)_3COH$, $[(CF_3)_2CF](CF_3)_2COH$, $(C_3F_7)_2(C_2F_5)COH$, $(C_3F_7)(C_2F_5)(CF_3)COH$, $(C_6F_{13})(C_2F_5)(CF_3)COH$, $C_6F_5OH$, $CF_3$—$C_6F_4OH$, $(CF_3)_2$—$C_6F_3OH$, $(C_2F_5)_2$—$C_6F_3OH$, $C_6F_5C(CF_3)_2OH$, $C_6F_5C(CF_3)(C_2F_5)OH$, and $CF_3$—$C_6F_4C(CF_3)_2OH$.

The alkali metal cation of the initiator $R_fOM$ may be derived from lithium, sodium, potassium, rubidium and cesium. The quaternary ammonium ion may also be used. These salts are prepared by reaction of a monohydroxy perfluoro hydrocarbon compound $R_fOH$ with a base of an alkali metal such as the alkali metal carbonates. The compounds $R_fOH$ are acidic in the same order of magnitude as acetic acid or greater. For best results in the present process, the alkali metal is chosen so that the salt initiator is soluble in the reaction medium. In general, cesium gives the most soluble salts in aprotic solvents with lithium, sodium, potassium and rubidium being somewhat less soluble. For this reason, the cesium salt initiators are most preferred in the present process.

The monohydroxy perfluoro hydrocarbon compounds $R_fOH$ utilized in this invention to form the initiator salts $R_fOM$ are well known in the art and are available from several sources. The perfluoro-tertiary alkanols are available, for example, by reaction of perfluoroketones or esters of perfluoroinated carboxylic acids with the Grignard reagents of perfluoroalkyl iodides or bromides or with perfluoroalkyl lithium compounds. Another method for preparing these alkanols is by the treatment of perfluorinated ketones with sodium alkoxides (for example, see the ACS Monograph "Aliphatic Fluorine Compounds," by Lovelace et al., published 1958, p. 137 et seq.).

A method for preparing the alkali salt initiators $R_fOM$ directly is by reacting perfluorinated ketones with a perfluoroolefin such as tetrafluoroethylene or hexafluoropropylene in the presence of an alkali metal fluoride in a polyether solvent. A practical illustration of this described process follows. Hexafluoroacetone is added to a vessel containing a solution of cesium fluoride and diethyleneglycol dimethyl ether $[CH_3O(CH_2CH_2O)_2CH_3]$ in increments so that the pressure in the vessel does not exceed 25 p.s.i.g. The reaction mass is heated to 100° C. and tetrafluoroethylene is added in increments while the internal pressure is maintained below 25 p.s.i.g. at 95° C. to 100° C. Thereafter, the reaction mass is cooled, the solvent evaporated leaving a good yield of the alkali metal salt

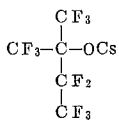

The perfluorinated phenols $C_nF_{2n-7}OH$ and the alkyl-substituted perfluorinated phenols are prepared by reaction of the corresponding perfluorinated benzene derivatives with an alkali hydroxide such as the reaction of perfluorobenzene with KOH to form perfluorophenol as described by Haszeldine et al., in J. Chem. Soc., 1959, p. 13. Reaction of perfluorophenyl Grignard reagents or perfluorophenyl lithium compounds with perfluoroketones forms the tertiary alcohols containing pentafluorophenyl groups.

The present process is carried out in a polar aprotic organic reaction medium. These liquids are chosen from nitriles such as benzonitrile or acetonitrile, dialkyl ethers of alkylene glycols of formula $RO(C_pH_{2p}O)_nR$, where R is alkyl of 1 to 4 carbons, $p$ is 2 to 4 and $n$ 1 to 4. Other useful media are those containing no active hydrogen such as dimethyl sulfoxide or N-methyl-pyrrolidone. Of these acetonitrile and the ethers $$CH_3O(CH_2CH_2O)_nCH_3$$

where $n$ is 1 to 4 are preferred.

The epoxides useful in the present invention have the structure

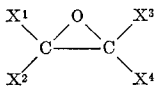

where the X's are fluorine, chlorine, perfluoroalkyl, or —H perfluoroalkyl or where $X^2$ and $X^4$ together are perfluoroalkylene forming a cyclic epoxide. At least two of the X groups must be fluorine and the sum of the carbon atoms of the epoxide is from 2 to 10. Representative examples of the epoxides utilized in this invention are tetrafluoroethylene oxide, hexafluoropropylene oxide, chlorotrifluoroethylene oxide, 1,2-epoxyperfluorobutane, 2,3-epoxyperfluorobutane, 1,2-epoxy-8H-perfluorooctane, 1,2 - epoxyperfluorohexane, 1,2-epoxyperfluorocyclopropane, 1,2-epoxyperfluorocyclopentane, and 1,2-epoxyperfluorocyclohexane. These epoxides are prepared by reaction of the corresponding olefin.

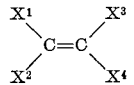

with an alkaline ionorganic peroxide according to the procedure of British Patent 904,877.

In carrying out the present procedure, the alkali metal salt $R_fOM$ is dissolved in the reaction medium, then the epoxide is added. The amount of reaction medium used is not critical so long as it is sufficient to dissolve the alkali metal salt. The relative amounts of alkali metal salt and epoxide are not critical although they do determine to some extent the molecular weight of the polymer prepared in the process. It is desirable normally to have at least one mole of epoxide for each mole of salt. The pressure and temperature at which the reaction is carried out are not critical. However, the present process is best carried out at atmospheric pressure between the temperatures of —60° C and +80° C. The most preferred temperatures are between —60° C. and +30° C. Since water tends to destroy the homogeneous nature of the reaction system, the reaction should not be carried out in the presence of gross amounts of water. It is preferred to carry out the reaction under anhydrous conditions. The product polyethers are recovered by standard techniques. Usually the higher molecular weight polymers are insoluble and separate readily from the reaction medium whereby they are easily recovered. Lower molecular weight products may be recovered if necessary by distillation.

In the present process, the initiator $R_fOM$ enters the polymer products as end groups. The products, therefore, form the structure

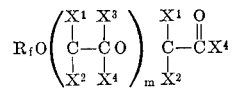

In this formula either $X^1$ or $X^2$ may be other than fluorine, but generally $X^3$ and $X^4$ are fluorine, except where $X^2$ and $X^4$ are perfluoroalkylene. For example, hexafluoropropyelne oxide gives products of structure

The value of $m$ may vary over wide limits, say 1 to 100. The value of $m$ and hence the molecular weight of the polymer product is determined in part at least by the initial mole ratio of epoxide to alkali metal salt. If this ratio is near one, $m$ will be predominantly one. On the other hand, when a large number of moles of epoxide is used for each mole of alkali metal salt, $m$ will be large and mixtures will be obtained.

The preferred initiators in the present process are the cesium salts of $(CF_3)_3COH$, $(CF_3)_2C(C_2F_5)OH$, $$(C_2F_5)_2C(CF_3)OH,$$

$(C_2F_5)_3COH$, and $C_6F_5OH$ and the preferred epoxide is hexafluoropropylene oxide. Hence the preferred products will have the structure indicated for hexafluoropropylene oxide products above where $R_f$ is one of the perfluoro groups attached to the hydroxyl indicated in this paragraph.

The products of this invention are useful primarily as intermediates for preparing derivatives which have a number of uses. For example, the terminal-COF group of the polymer products produced according to the process of this invention may be hydrolyzed to the free acid or replaced by fluorine or hydrogen. The free acid and salts thereof are useful as surfactants and dispersing agents. The acid fluoride polymer products may also be dimerized with ultraviolet light or pyrollized to an olefinic material. Uses for derivatives formed from the intermediates prepared in this invention are described in U.S. Patents 3,088,958, 3,114,778, 3,125,599, and 3,132,123 and in foreign patents such as French Patents 1,275,799, 1,323,803, 1,366,119, 1,341,087, 1,342,515, and 1,373,014 and British Patent 949,285.

Representative examples illustrating the present invention follow. All parts are by weight unless otherwise specified.

EXAMPLE 1

To a glass apparatus, equipped with a reaction stirrer and a carbon-ice acetone condenser, was added a solution of 496 parts of cesium perfluoro(t-amyl oxide) in 350 parts by volume of diethyleneglycol dimethyl ether. To this solution was added 166 parts of hexafluoropropylene oxide gas under anhydrous conditions and under a nitrogen atmosphere. The reaction medium was agitated throughout the reaction. The temperature of the reaction mixture rose from 25° C. to 34° C. during reaction which covered a period of 4 hours. The reaction mixture became turbid during reaction and a colorless oil separated. This dense oil (162 parts) was separated and fractionated to give 87.5 parts of a liquid, B.P. 97 to 100° C. whose structure was shown to be 2(perfluoro-t-amyloxy)-prefluoropropionyl fluoride by infrared, nuclear magnetic resonance and mass spectral analysis.

EXAMPLE 2

Cesium perfluoro(t-amyl oxide) was prepared by refluxing 75 parts of cesium carbonate and 50 parts of perfluoro-t-amyl alcohol in 100 parts of 1,2-dimethoxyethane. The cesium salt of the perfluoro-t-amyl alcohol was isolated by filtration and evaporation of the filtrate under vacuum. This solid retained its activity as a polymerization initiator after storage for over nine months in an area protected from undue moisture.

Three hundred and fifty parts of hexafluoropropylene oxide were condensed into a flask fitted with a carbon-ice condenser, thermometer, stirrer, and dry nitrogen sweep. The temperature of the contents of the flask was adjusted to −30° C. by means of a cooling bath. To the flask were added through a dropping funnel 4.2 parts of the cesium perfluoro(t-amyl oxide) prepared above and 3.0 ml. of anhydrous tetraethyleneglycol dimethyl ether with stirring. The temperature of the reaction mixture was then lowered to −40° C. and held at −38° C. to −44° C. for 21 hours, after which the system was allowed to warm to room temperature. Three hundred and thirty-nine parts of a liquid polymer having a molecular weight of 2,000 (determined by infrared analysis) were isolated. An infrared band of 11.2 microns confirmed the presence of the perfluoro(t-amyloxy) end group.

EXAMPLE 3

Cesium perfluoro(t-butoxide) was prepared in an analogous manner to the cesium perfluoro(t-amyl oxide) of Example 2. One part of this salt was dissolved in 2 parts tetraethyleneglycol dimethyl ether and added to 250 parts hexafluoropropylene oxide held at approximately −40° C. under anhydrous conditions. After 48 hours, 217 parts of polymer were obtained of average molecular weight equal to 992. The infrared analysis confirmed the presence of the perfluoro(t-butoxide) end group.

EXAMPLE 4

Cesium perfluoro(3 - methyl - 3 - amyl oxide) was prepared as in Example 2 from the corresponding perfluorocarbinol. A solution of 1.4 parts of cesium perfluoro(3-methyl-3-amyl oxide) and 3 parts of tetraethyleneglycol dimethyl ether were added to 250 parts of hexafluoropropylene oxide under anhydrous conditions. The reaction mass was maintained with the cooling bath at an average temperature of −42° C. for 24 hours. Upon removal of the cooling bath, the temperature of the reaction mass rose within a few minutes to 0° C. The cooling bath was then replaced and the reaction completed by maintaining the mass at −20° C. for 12 hours. Two hundred and twenty-four parts of polymer of average molecular weight equal to 1700 were obtained. The infrared analysis confirmed the presence of the perfluoro(3-methyl-3-amyl oxide) end group.

EXAMPLE 5

Cesium perfluoro(3-ethyl-3-amyl oxide) was prepared as in Example 2. Two parts of cesium perfluoro(3-ethyl-3-amyl oxide) dissolved in 4 parts of tetraethyleneglycol dimethyl ether were added to 250 parts of hexafluoropropylene oxide under anhydrous conditions. After 48 hours at an average temperature of −40° C., 250 parts of polymer, average molecular weight equal to 2032, were recovered. The infrared analysis confirmed the presence of the perfluoro(3-ethyl-3-amyl oxide) end group.

When equivalent amounts of 1,2-epoxy-8H-perfluorooctane are substituted for hexafluoropropylene oxide in the above reaction, a high molecular weight polymer is formed.

EXAMPLE 6

Cesium pentafluorophenoxide was prepared as in Example 2 from cesium carbonate and pentafluorophenol. This salt crystallizes in long needles from 1,2-dimethoxyethane. A solution of 0.75 part of cesium pentafluorophenoxide in 2 parts tetraethyleneglycol dimethyl ether were added to 250 parts hexafluoropropylene oxide kept at −40° C. under anhydrous conditions. After 48 hours at −40° C., 237 parts of polymer were obtained with an average molecular weight equal to 1600. An infrared band at 6.56 microns confirmed the presence of the pentafluorophenoxy end group.

EXAMPLE 7

Approximately 30 parts of chlorotrifluoroethylene oxide were condensed into a stirred flask held at −78° C. and kept under anhydrous conditions. Four parts of a 0.1 molar solution of cesium perfluoro(t-amyl oxide) in anhydrous diethyleneglycol dimethyl ether were added. The temperature was brought to −65° C. and held there for three days. Essentially quantitative conversion to polymer occurred. The average molecular weight of the polymer was 3023 and the infrared band of 11.2 microns confirmed the presence of the perfluoro(t-amyloxy) end group.

EXAMPLE 8

Under anhydrous conditions (glove box) a pressure bottle was loaded with 3 parts of tetramethyleneglycol dimethyl ether and 1.7 parts of cesium perfluoro(t-amyl oxide). The bottle was sealed with a head containing a pressure gauge and gas inlet valve. The bottle was evacuated. A cylinder of 1,2-epoxyperfluorocyclopentane was connected to the gas inlet. The pressure bottle was then cooled and 25 parts of 1,2-epoxyperfluorocyclopentane was distilled into the bottle. The gas inlet was sealed and the pressure bottle set aside for eight weeks, with occasional agitation. After this time, distillation of the contents of the pressure bottle gave 13 parts unreacted epoxide and 10 parts of a viscous oil whose structure by infrared and nuclear magnetic resonance analysis indicates a structure of

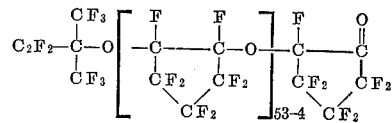

When equivalent amounts of 1,2-epoxyperfluorocyclohexane are substituted for the 1,2-epoxyperfluorocyclopentane in the above procedure, a high molecular weight polymer of 1,2-epoxyperfluorocyclohexane is formed.

It is to be understood that the preceding examples are representative and that said examples may be varied within the scope of the specification, as understood by one skilled in the art, to produce essentially the same result.

As many apparently widely different embodiments of this invention may be made without departing from the spirit and scope thereof, it is to be understood that this invention is not limited to the specific embodiments thereof except as defined in the appended claims.

The embodiment of the invention in which an exclusive property or privilege is claimed are defined as follows:

1. A process for preparing a polyether which comprises
 (A) contacting more than one mole of a polyfluoroolefin epoxide with each mole of a salt of the structure $R_fOM$ in a polar aprotic organic reaction solvent, wherein M is an alkali metal cation and $R_f$ is a $C_4$ to $C_{10}$ perfluoro hydrocarbon free of aliphatic unsaturation, said salt being characterized by having the oxygen atom attached to the $R_f$ group through a carbon atom which is in turn attached only to other carbon atoms, and
 (B) recovering from the mixture the resulting polyether.

2. A process for preparing a polyether which comprises
 (A) contacting more than one mole of a polyfluoroolefin epoxide of the structure

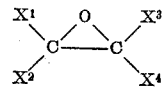

with each mole of a salt of the structure $R_fOM$ in a polar aprotic organic reaction solvent at a temperature between $-60°$ C. and $+80°$ C., wherein M is an alkali metal cation, $R_f$ is a $C_4$ to $C_{10}$ perfluoro hydrocarbon free of aliphatic unsaturation, said salt being characterized by having the oxygen atom attached to said $R_f$ group through a carbon atom which is in turn attached only to other carbon atoms, and $X^1$, $X^2$, $X^3$, and $X^4$ are each independently selected from the group consisting of fluorine, chlorine, perfluoroalkyl, and $\omega$-H perfluoroalkyl, or $X^2$ and $X^4$ are jointly perfluoroalkylene forming a cyclic epoxide, with the proviso that at least two of the groups $X^1$, $X^2$, $X^3$, and $X^4$ are fluorine and the total number of carbon atoms in the epoxide is from 2 to 10, and (B) recovering from the mixture the resulting polyether.

3. The process of claim 2 wherein the alkali metal cation M is cesium.

4. The process of claim 2 wherein the polar aprotic solvent is an ether of the structure $$CH_3O(CH_2CH_2O)_nCH_3$$

where $n$ is an integer from one to four.

5. The process of claim 2 wherein the polar aprotic solvent is acetonitrile.

6. The process of claim 2 wherein the polyfluoroolefin epoxide is hexafluoropropylene oxide.

7. The process of claim 2 wherein the salt $R_fOM$ is prepared by the reaction of a $C_4$ to $C_{10}$ perfluorinated tertiary alkanol and an alkali metal base.

8. The process of claim 2 wherein the salt of the structure $R_fOM$ is $(CF_3)_3COCs$.

9. The process of claim 2 wherein the salt of the structure $R_fOM$ is $(CF_3)_2C(C_2F_5)OCs$.

10. The process of claim 2 wherein the salt of the structure $R_fOM$ is $(C_2F_5)_2C(CF_3)OCs$.

11. The process of claim 2 wherein the salt of the structure $R_fOM$ is $(C_2F_5)_3COCs$.

12. The process of claim 2 wherein the salt of the structure $R_fOM$ is $C_6F_5OCs$.

13. The process of claim 2 wherein the reaction is carried out under essentially anhydrous conditions.

14. A process for preparing 2-perfluoro-t-amyloxy)-perfluoropropionyl fluoride which comprises (A) contacting hexafluoropropylene oxide with an equimolar amount of cesium perfluoro(t-amyl oxide) in diethyleneglycol dimethyl ether at a temperature between $-60°$ C. and $+80°$ C., and (B) recovering from the mixture said 2(perfluoro-t-amyloxy)perfluoropropionyl fluoride.

15. A process for preparing a polyfluorinated ether which comprises (A) contacting a polyfluoroolefin epoxide with a salt of the structure $R_fOM$ in a polar aprotic organic reaction solvent wherein M is an alkali metal cation and $R_f$ is a $C_4$ to $C_{10}$ perfluoro hydrocarbon free of aliphatic unsaturation, said salt being characterized by having the oxygen atom attached to the $R_f$ group through a carbon atom which is in turn attached only to other carbon atoms, and (B) recovering from the mixture the resulting polyfluorinated ether.

16. A polyether of the formula

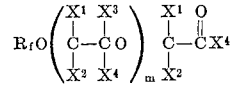

in which $R_f$ is a $C_4$ to $C_{10}$ perfluoro hydrocarbon free of aliphatic unsaturation; the oxygen atom of the $R_fO$ group is attached to the $R_f$ group through a carbon atom which is in turn attached only to other carbon atoms; $X^1$, $X^2$, $X^3$ and $X^4$ are each independently selected from the group consisting of fluorine, chlorine, perfluoroalkyl and $\omega$-H perfluoroalkyl, or $X^2$ and $X^4$ are jointly perfluoroalkylene forming a cyclic group, with the proviso that at least two of the groups $X^1$, $X^2$, $X^3$ and $X^4$ are fluorine and the total number of carbon atoms in the

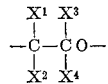

group is from 2 to 10; and $m$ is 1 to 100.

17. The polyether of claim 16 which is of the formula

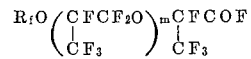

18. The polyether of claim 17 in which $R_f$ is $$(CF_3)_3C-$$

19. The polyether of claim 17 in which $R_f$ is $$(CF_3)_2(C_2F_5)C-$$

20. The polyether of claim 17 in which $R_f$ is $$(C_2F_5)_2(CF_3)C-$$

21. The polyether of claim 17 in which $R_f$ is $$(C_2F_5)_3C-$$

22. The polyether of claim 17 in which $R_f$ is $(C_6F_5)-$.

References Cited

UNITED STATES PATENTS

| | | | |
|---|---|---|---|
| 3,250,807 | 5/1966 | Fritz et al. | 260—544 |
| 3,250,808 | 5/1966 | Moore et al. | 260—544 |
| 3,303,145 | 2/1967 | Carlson | 260—544 |

LORRAINE A. WEINBERGER, *Primary Examiner.*

J. H. NIELSEN, *Assistant Examiner.*